No. 844,717.

PATENTED FEB. 19, 1907.

E. R. FELLOWS.
TURRET GEAR CUTTER.
APPLICATION FILED APR. 24, 1905.

WITNESSES
P. W. Pezzetti
L. E. Kennedy

INVENTOR
E. R. Fellows
by Wright, Brown, Quinby & May
Attorneys

No. 844,717. PATENTED FEB. 19, 1907.
E. R. FELLOWS.
TURRET GEAR CUTTER.
APPLICATION FILED APR. 24, 1905.

WITNESSES:
P. W. Pezzetti
L. E. Kennedy.

INVENTOR
E. R. Fellows
by Wright, Brown,
Quinby & May
Attorneys

No. 844,717. PATENTED FEB. 19, 1907.
E. R. FELLOWS.
TURRET GEAR CUTTER.
APPLICATION FILED APR. 24, 1905.
9 SHEETS—SHEET 6.

Fig. 7.

WITNESSES:
P. H. Pezzotti
L. E. Kennedy.

INVENTOR:
E. R. Fellows
by Wright, Brown,
Quinby & May
Attys.

No. 844,717. PATENTED FEB. 19, 1907.
E. R. FELLOWS.
TURRET GEAR CUTTER.
APPLICATION FILED APR. 24, 1905.

WITNESSES:
INVENTOR:

UNITED STATES PATENT OFFICE.

EDWIN R. FELLOWS, OF SPRINGFIELD, VERMONT, ASSIGNOR TO THE FELLOWS GEAR SHAPER COMPANY, OF SPRINGFIELD, VERMONT, A CORPORATION OF VERMONT.

TURRET GEAR-CUTTER.

No. 844,717.  Specification of Letters Patent.  Patented Feb. 19, 1907.

Application filed April 24, 1905. Serial No. 257,077.

*To all whom it may concern:*

Be it known that I, EDWIN R. FELLOWS, of Springfield, in the county of Windsor and State of Vermont, have invented certain new and useful Improvements in Turret Gear-Cutters, of which the following is a specification.

This invention relates to machines for cutting gears in which a gear-shaped planing-cutter is caused to reciprocate in a line parallel to the axis of a cylindrical blank of metal and plane off particles of the blank at each reciprocation, the cutter and blank being simultaneously rotated as the cutting operation is going on, whereby the cutter is caused to generate and form teeth on the blank of a shape to mesh with the teeth of the cutter.

The object of the invention is to minimize the delay necessary for removing a finished gear and substituting a blank. Ordinarily a machine of this class requires as much of the operator's time for changing a blank as is occupied in the cutting operation, and consequently a large portion of the time is required to change the work.

The invention consists, therefore, in a machine of the character above referred to having a multiplicity of holding means for retaining a blank in operative position with respect to the cutter and provided with suitable means for changing the position of these blank-holders to remove a finished gear from proximity to the cutter and bring a new blank automatically into position and to furnish suitable mechanism for feeding and indexing the blanks and blank-holders.

Of the accompanying drawings.

The same reference characters indicate the same parts in all the figures.

In its main essentials the machine of this invention is identical with that illustrated and described in Letters Patent of the United States granted to me March 30, 1897, No. 579,708, and June 11, 1901, No. 676,227, but differs from said machine in that in place of a single device for holding a blank I have provided here means for holding at one time a plurality of blanks, preferably six, and the necessary means for moving the blank-holder to present successive blanks to the action of he cutter, as well as modifications and improvements in the mechanism for feeding the cutter and blank.

The machine is driven through a cone-pulley 1 on shaft 2 in bearings in the frame 3 of the machine by a belt from a counter-shaft or other suitable source of power, and shaft 2 drives a main crank-shaft 4 by means of a pulley 5, fast to shaft 2, and a belt 6, passing over pulley 5 and the belt-engaging surface 7 of a casing 8, mounted to rotate loosely on the shaft 4. Mounted on the shaft within the casing 8 are gears 9 10 11, of which the former is tight on the shaft, while the latter are loose, and their hubs 13 14 are extended out beyond the limits of the casing, the latter being actually journaled upon the hubs 13 14 rather than directly upon the shaft. The casing carries studs 15 16, on the first of which are mounted rotatable pinions 17 18, which are rigidly connected to each other preferably by being formed from a single piece of stock and meshing with the loose gears 10 11, while similarly mounted on the stud 16 are pinions 19 20, which are rigidly united together and mesh, respectively, with the fast gear 9 and loose gear 11. It will be seen that these pinions connect the fast gear 9 with the loose gear 11 and the latter with loose gear 10 independently of the tight gear, whereby motion may be given to the fast gear at different rates of speed. The casing 8 constitutes a holder or carrier for the pinions 17 18 19 20 and as it is rotated by the belt carries the pinions about the gears 9 10 11 and as gear 9 is tight on the shaft and normally stationary drives gears 10 and 11 loosely.

Shaft 4 has connected to it at one end a crank 21, which drives a connecting-rod 22, having a wrist connection at 23 with a screw 24, which passes through the apron or support 25 of a multiple work-holder which is slidably mounted on a guideway 26, extending at one side of the machine. An adjustable connection is provided between the screw 24 and apron 25 by a nut 27, engaged with the threads of the screw and rotatably held in the apron. The nut has connected to it a bevel-gear 28, which meshes with a second bevel-gear 29, the shaft 30 of which extends out from the front of the machine, where it can be engaged and manually turned to rotate the nut and adjust the blank-holder with respect to the screw. As the crank-shaft 4 is rotated it reciprocates the blank-holder back and forth away from and toward the cutter 31 for the purpose of permitting a completed gear to be removed and of presenting a new blank in position to be operated upon by the cutter. The motion of the work-holder away from the cutter and the greater part of its return motion is at a comparatively high speed, which allows the turret 32, carrying the blanks to be indexed, so as to bring a new blank to the cutter and brings the blank into position almost in contact with the cutter, while the remainder of this motion is made at a greatly-reduced speed and feeds the blank to the cutter until the teeth of the latter have penetrated to the proper depth into the blank.

The turret 32 is rotatably mounted upon a central stud 33 on the body or apron 25 of the blank-holder and carries rotatably mounted in bearings a plurality of spindles 34, which are adapted to hold gear-blanks 35. Eccentrically mounted in the apron and extending through stud 33 into the turret is a driving spindle or shaft 36, which is located between the center of the turret and the cutter—that is, it is on that side of the center of the turret which is toward the cutter. Shaft 36 carries fixedly connected to it a pinion 37, and the blank-holding spindles carry pinions 38 in the same plane with pinion 37 and adapted to mesh therewith, these pinions constituting complemental clutch members. As shaft 36 is eccentric to the turret, while the spindles 34 are arranged at equal distances therefrom, pinion 37 can mesh with only one of the pinions 38 at a time, and the one with which it meshes must be that connected to the spindle nearest the cutter. I have here shown the shaft 36 as extending up beside and out of line with the spindles 34; but I do not confine myself to such a construction, as I may arrange shaft 36 in line with the position occupied by the spindle nearest the cutter and provide suitable clutch mechanism other than the pinions shown for connecting the shaft with the several spindles.

The lower ends of spindles 34 are rotatably mounted in bushings 39, held in the turret, the lower ends of which bushings project down below the bottom of the turret into a groove 40, formed in the apron. A carrier 41 projects tangentially into an opening in one side of the apron beneath the turret and approximately tangential to the arc on which the blank-holding spindles are located. This carrier has pivoted to it at 42 a dog 43, the free end of which is held in a substantially horizontal position by a spring 44. The end of the dog is square, while the upper surface near the end is upwardly inclined, forming a cam-surface 45. This portion of the dog projects up into the path traveled by the outermost spindles as the apron is moved from left to right, being depressed while one of the bushings moves over the cam-surface 45 and rising again at the left of such bushing after it has passed. On the return movement of the apron the dog engages one of the bushings, as 39, and holds it stationary, thereby causing the turret to be rotated about the stud 33 until the next bushing 39$^a$ strikes an abutment 46 on the carrier, this abutment being reinforced by a hardened plate 47, set into the face of the upwardly-projecting rib 48 of the carrier. When the bushing 39ª has engaged this abutment, further rotation of the turret is impossible, and the latter is thereby held locked with the spindle 34ᵇ in the proper position to be operated on by the cutter. In order to permit further motion of the blank-holder to give the depth feed, the carrier is mounted yieldingly, its left-hand portion extending slightly through a lug 49, while a spring 50, surrounding this portion of the carrier and abutting against the lug and a shoulder on the carrier tends to hold it projected toward the right.

As was previously stated, the gears 10 and 11 are normally loose on the shaft 4 and the friction of the latter and the apron holds it and the gear 9 stationary. When it is necessary, however, to move the blank-holder to index the turret, the gear 11 is engaged by mechanism to be presently described and held stationary. This causes the planetary pinions 20 19 to be rotated as they travel about gear 11 and to rotate gear 9 and thereby the shaft at a speed approximately one-fourteenth that of the casing, causing the crank and connecting-rod to be operated and the blank-holder to move away from and back toward the cutter a sufficient distance to index the turret and bring a blank into close proximity with the cutter. Thereupon gear 11 is released and gear 10 is immediately engaged and held stationary. The planetary motion of the gears 18 17 about gear 10 then produces a slow differential movement in gear 11, which is transmitted through the planetary gears 20 19 to gear 9 at a still further reduced speed. This slow-speed motion continues throughout the remainder of the rotation of shaft 4 until crank 21 is again on the dead-point, which is substantially one-sixteenth of a rotation, and gives the necessary depth feed of the cutter into the blank, the first fifteen-sixteenths having been required to back off and rotate the turret.

Such movements as those above described are secured by providing the adjacent pinions with slightly-different numbers of teeth. For instance, suppose the gears 9 and 11 to have the same number of teeth, but that 19 has one tooth more or less than 20 and 17 one tooth more or less than 18. It will thus be seen that when gear 11 is held still one revolution of planetary pinions 19 20 will rotate gear 9 by the distance of one tooth, causing shaft 4 to turn at a fraction of the speed of the casing. In a similar manner when the gear 10 is restrained the planetary pinions 18 17 in revolving turn gear 11 very slowly, and by giving gear 11 one or two teeth more or less than gear 10 has it may be made to move slightly more or less than a distance of one tooth and in either direction, depending on which of the pinions has the greater number of teeth. Such motion being transmitted to gear 9 through the differential planetary pinions 20 and 19 gives shaft 4 a motion which is the differential between that of gear 11 and that which it has when the latter gear is stationary. By proper proportioning of the gears this may be made of any amount desired and will be designed according to the particular character of work required from each machine.

The mechanism by which first one of the loose gears and then the other is held stationary consists of ratchets 51 52, carried on the hubs 14 13, respectively, reciprocating pawls 53 54 coacting with these ratchets, respectively, and a weighted lever 55. The lever 55 is pivoted at 56 and has projections 57 58 with adjustable screw-threaded abutting pieces 59 60, which are adapted alternately to engage a pin 61 on a shaft 62, said shaft having collars 63 64 provided with gear-teeth, which engage, respectively, the pawl members 53 and 54. These pawls are mounted on opposite sides of shaft 62 so that the rotation of the shaft moves them simultaneously in opposite directions, moving one pawl into engagement with its respective ratchet and the other pawl out of engagement with its ratchet, and vice versa. When the shaft is in an intermediate position, (shown in Fig. 18,) both pawls are out of engagement with their ratchets. The weighted lever 55 has a slot 65 concentric with pivot 56, through which shaft 4 projects and has pins or studs 66 67 68, studs 67 and 68 being on opposite sides of the lever. Normally the lever stands in the position shown in Fig. 18, with its center of gravity at one side of its pivot, but being prevented from falling by engagement of studs 66 with a stop or latch 69. The stop is held in position to arrest pin 66 by means of a cam 70, which presses the free end of the stop forward against the tension of a spring 71. The cam is rotated by means of gear 11 through a worm 72, fast to the ratchet 51, carried by said gear, which worm meshes with and drives a worm-wheel 73, which, by means of change-gears 74 and 75 on its shaft and the shaft of cam 70, respectively, and an idle pinion 76 rotates the cam. The change-gears are so arranged that cam 70 is rotated once during the time required by the cutter to perform the number of strokes necessary to make a complete pinion.

Figure 1:
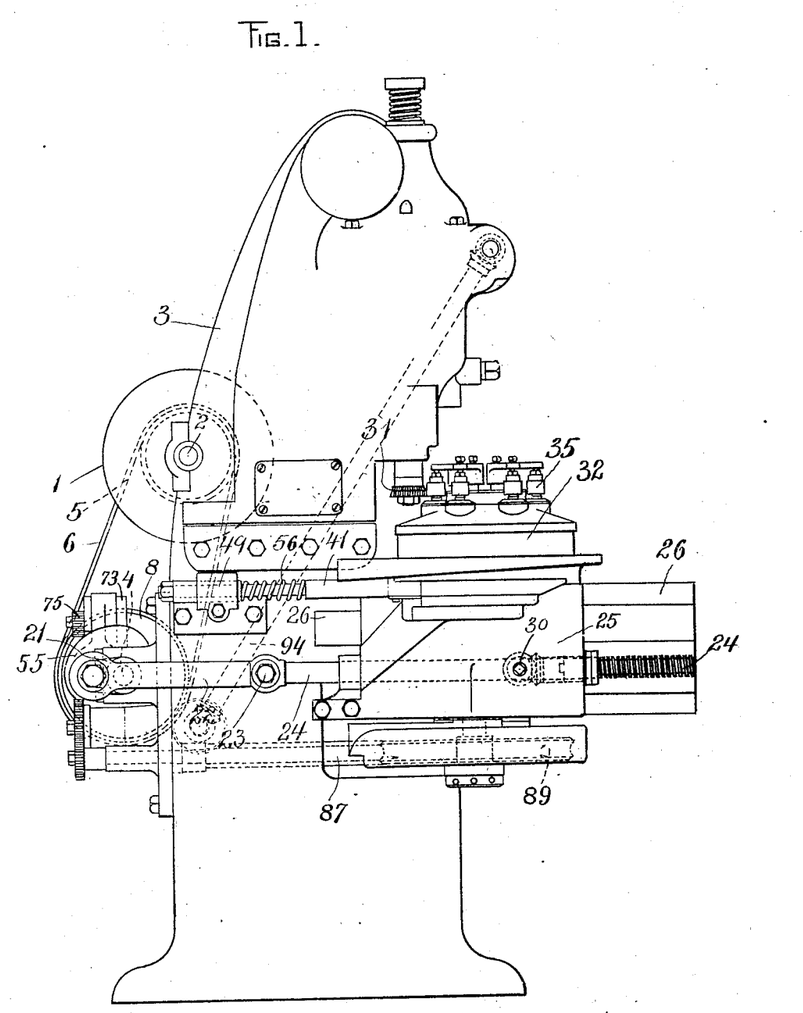
Figure 1 represents a front elevation of a machine embodying my invention.
Figure 2:
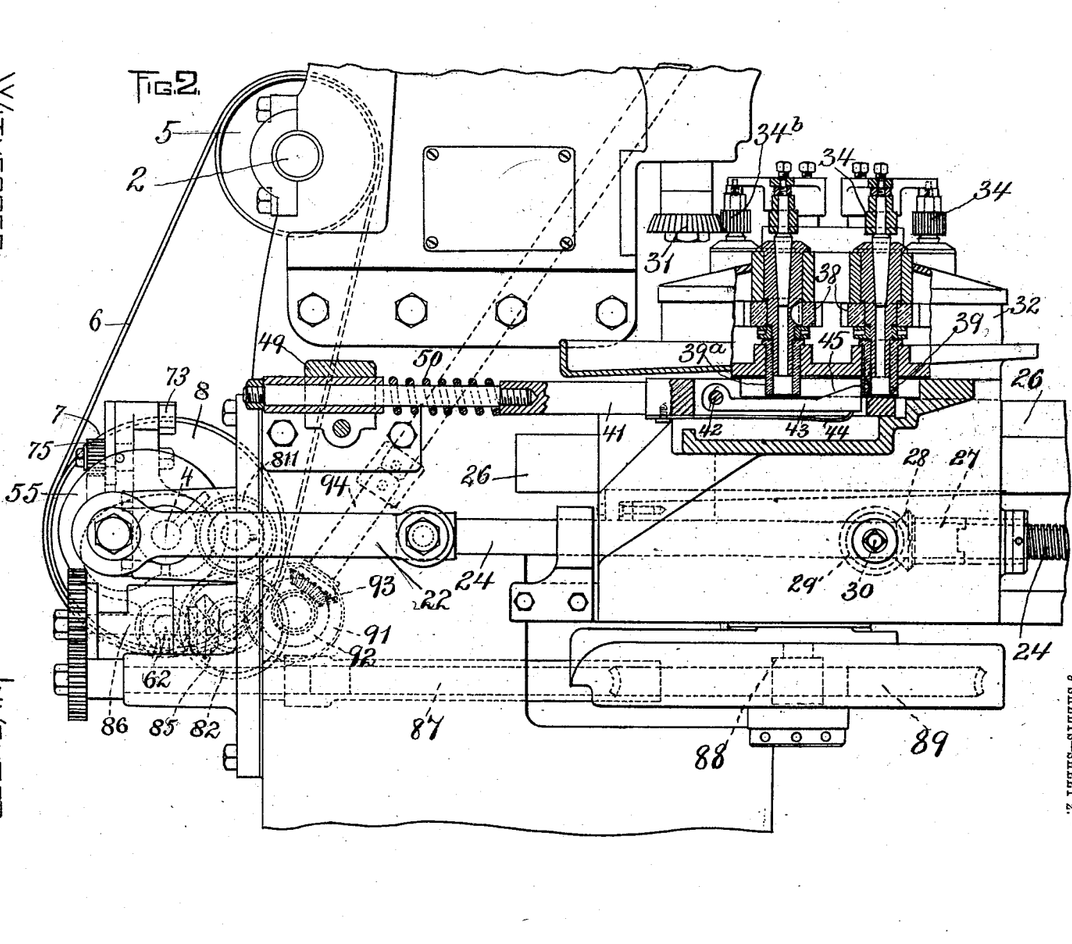
Fig. 2 represents a similar view, on an enlarged scale, of a portion of the machine, showing also a section taken through the auxiliary blank-holding spindles.
Figure 3:
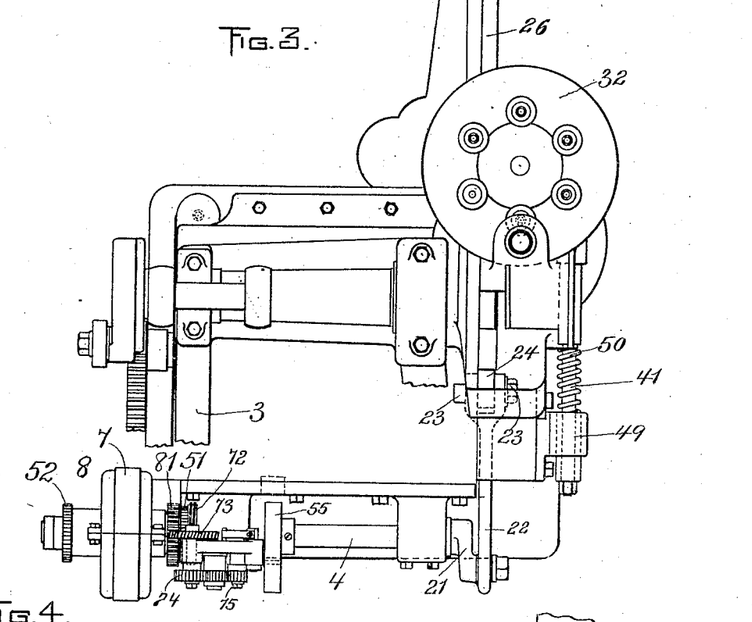
Fig. 3 represents a plan view of the machine, a portion of the upper part at one side thereof being broken away.
Figure 4:
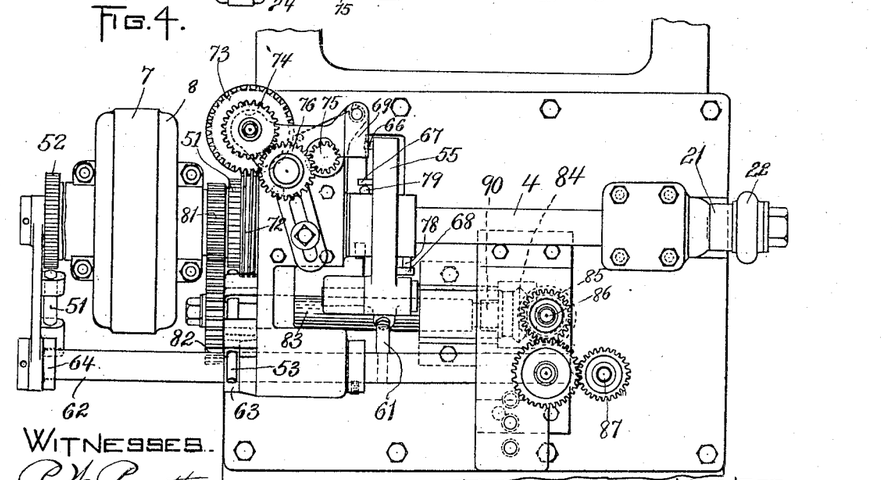
Fig. 4 represents an elevation of a portion of the driving mechanism as seen from the left of Fig. 1.
Figure 5:
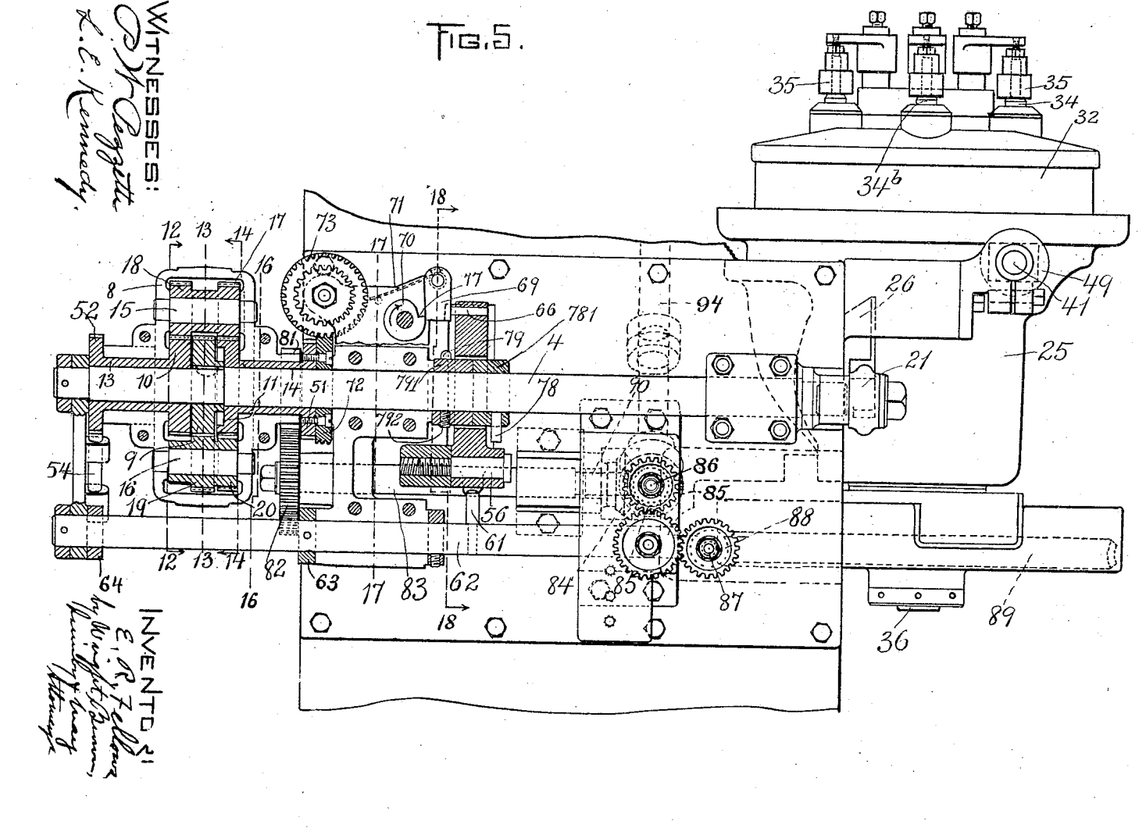
Fig. 5 represents, in section and on a somewhat-enlarged scale, the mechanism illustrated in Fig. 4.
Figure 6:
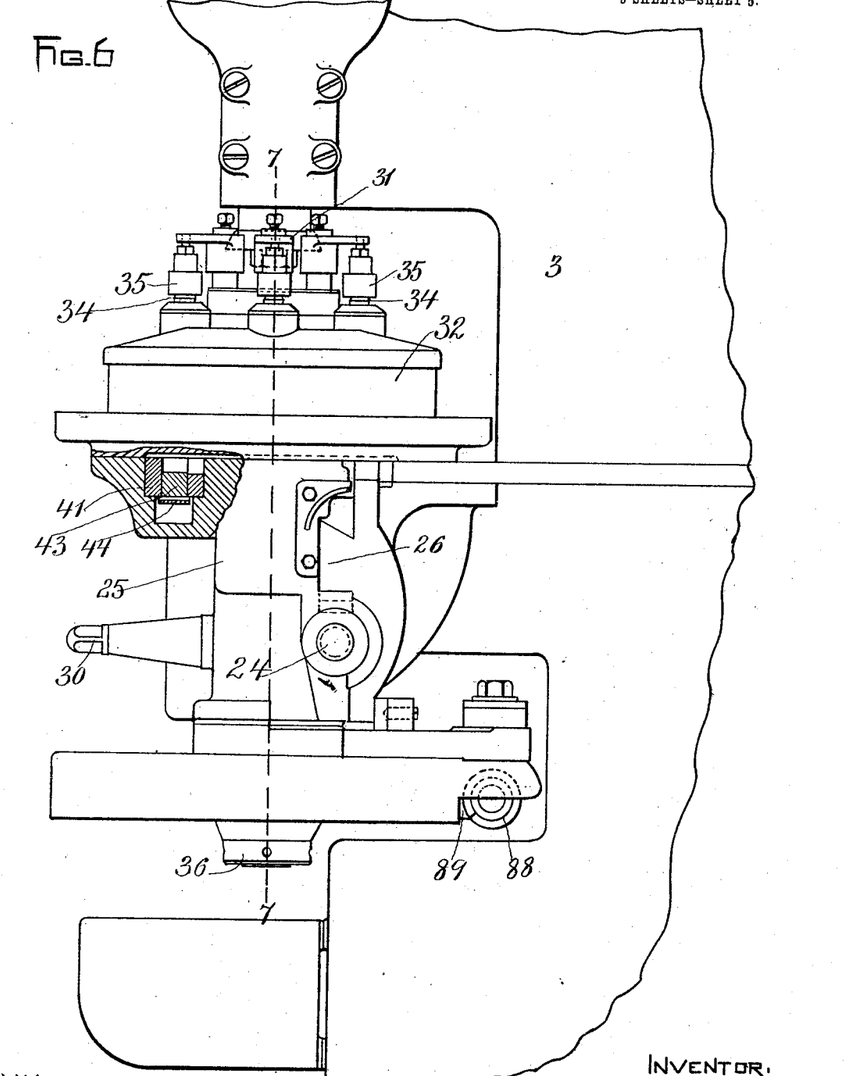
Fig. 6 represents a partial side elevation of the machine, as seen from the right of Fig. 1.
Figure 7:
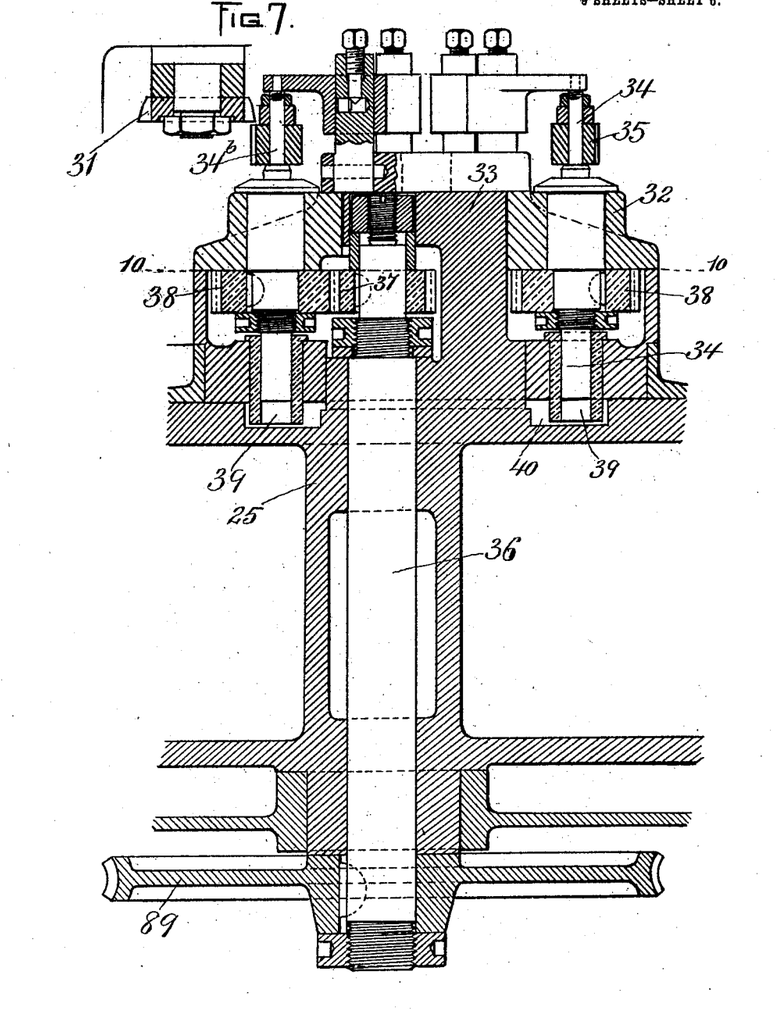
Fig. 7 represents an axial section of the blank-holding means, taken on line 7 7 of Fig. 6.
Figures 8, 9, 10, 11:
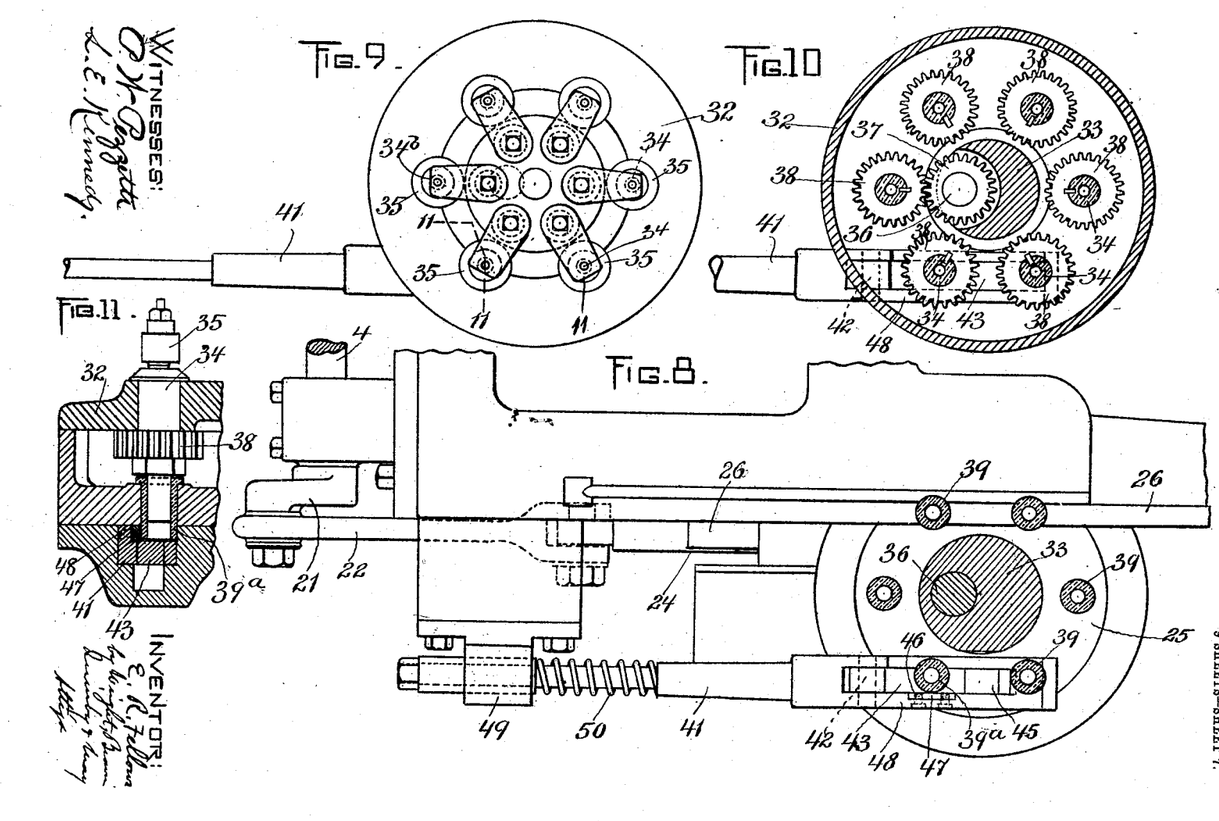
Fig. 8 represents a partial plan of the cabinet of the machine, the cutter-operating mechanism being removed, showing a section through the turret.
Fig. 9 represents a plan view of the blank-holding turret.
Fig. 10 represents a sectional plan view of the turret, as seen on line 10 10 of Fig. 7.
Fig. 11 represents a fragmentary section of the turret, taken on line 11 11 of Fig. 9.
Figure 12:
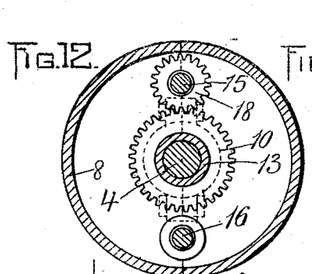
Figs. 12, 13, and 14 represent cross-sectional views of the planetary differential-gear mechanism, taken on lines 12 12, 13 13, and 14 14, respectively, of Fig. 5.
Figure 13:
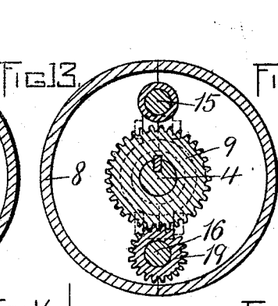
Figure 14:
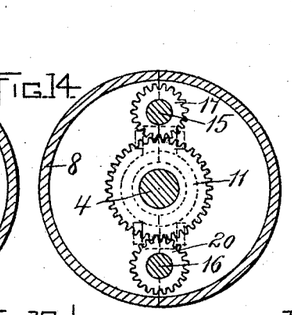
Figures 15, 16:
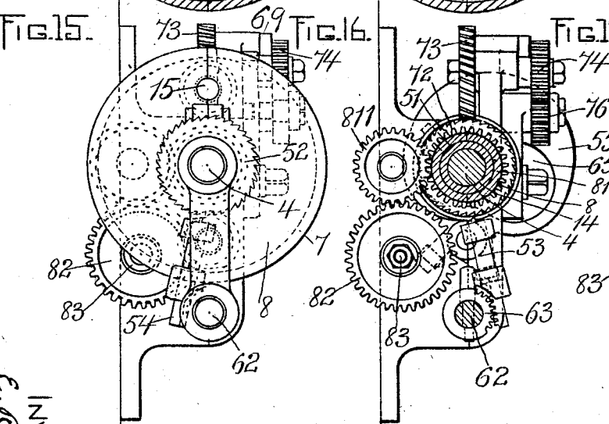
Fig. 15 represents an elevation of the driving mechanism as it appears at the rear of the machine.
Figs. 16, 17, and 18 represent sectional views taken on lines 16 16, 17 17, and 18 18, respectively, of Fig. 5 looking from left to right.
Figures 17, 18, 20:
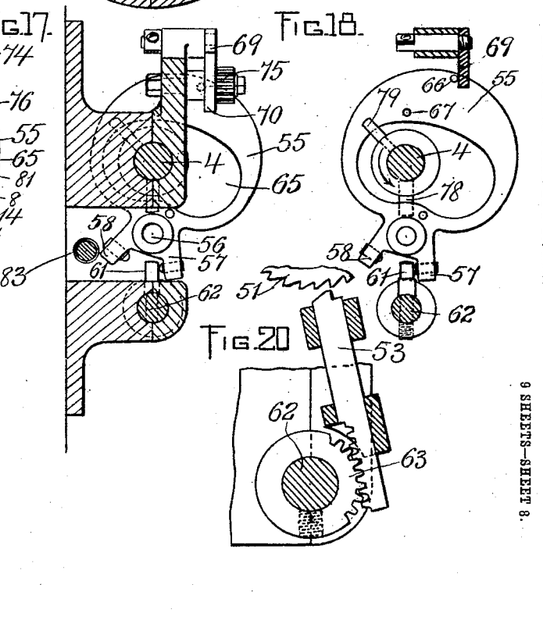
Fig. 20 represents a detail elevation of the pawl which coöperates with a part of the planetary gearing.
Figure 19:
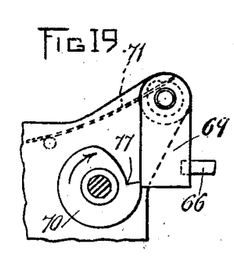
Fig. 19 represents a detail elevation of the latch for automatically releasing the pawl-operating weight.
Figures 21, 22, 23, 24, 25, 26, 27, 28, 29, 30:
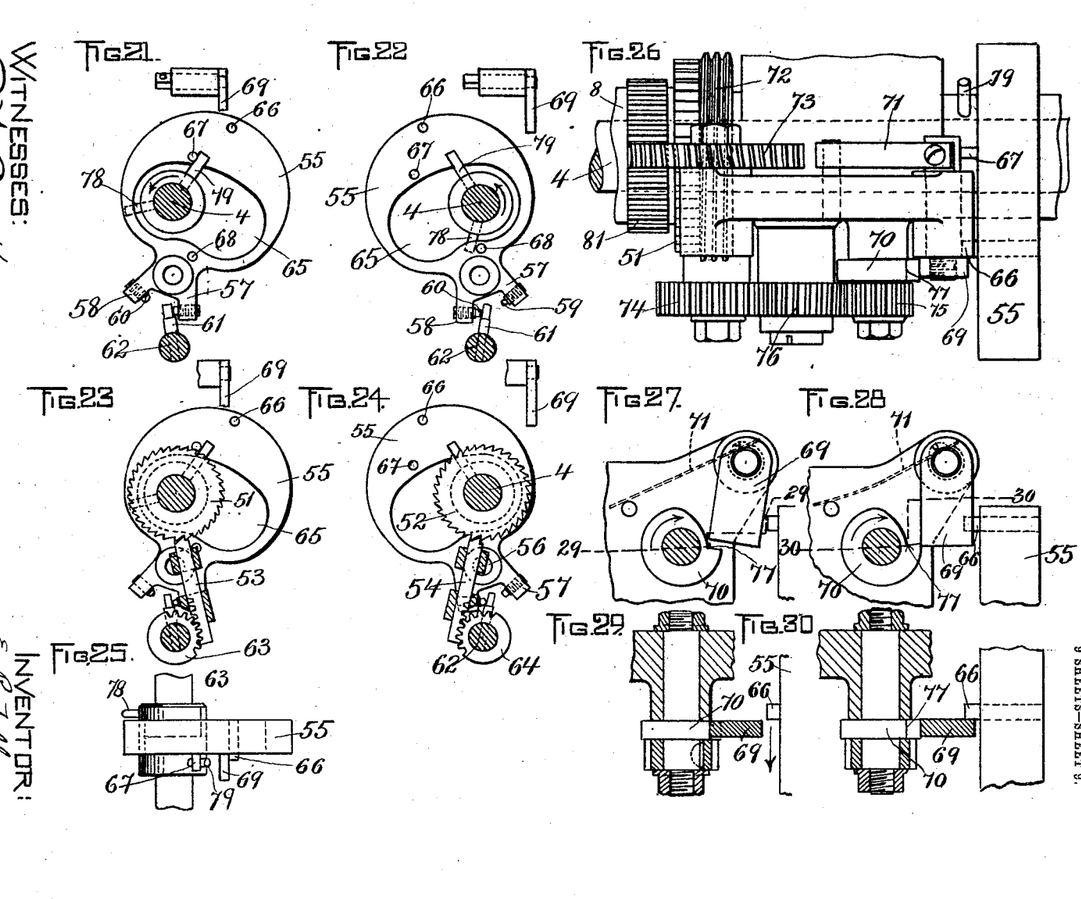
Figs. 21 and 22 represent the extreme positions of the weight which operates the pawls for controlling the planetary gearing.
Figs. 23 and 24 are similar views showing also the respective pawls and the ratchet-wheels engaged by them.
Fig. 25 represents a plan of the parts shown in Fig. 21.
Fig. 26 represents a plan of the timing mechanism.
Figs. 27 and 28 represent elevations showing different positions of the weight-controlling latch, shown also in Fig. 19.
Fig. 29 represents a sectional view taken on line 29 29 of Fig. 27.
Fig. 30 represents a section on line 30 30 of Fig. 28.

The cam is circular throughout the greater portion of its extent, but is formed with a single sharp notch or depression 77, which, when turned opposite the lower corner of latch 69 permits spring 71 to move the latter out of engagement with pin 66. This leaves the weighted lever unsupported, and it drops as far as it is permitted to go, turning shaft 62 by means of its engagement with the pin 61 to the left, as seen in Figs. 18, 21, and 24, elevating pawl 53 into engagement with the ratchet 51. When shaft 4 has turned through the greater part of a revolution, a pin 79 carried by it engages the stud 67 and throws the weighted lever over to the left from the position shown in Fig. 21 to that in Fig. 22, thereby causing the abutting stud 60 to engage pin 61 and move shaft 62 in right-hand rotation, thus moving pawl 53 out of engagement with its ratchet and engaging pawl 54 with ratchet 52, thus holding gear 10 stationary and giving the shaft its extremely slow motion. This motion continues until a pin or arm 78, projecting from shaft 4 on the opposite side of lever 55 from that on which pin 79 is located, engages the stud 68 and moves the weighted lever in the opposite direction. By this time, however, the cam 70 has been sufficiently rotated to project the latch 69 again, so that when the weighted lever is moved to the right its fall is arrested by the latch after it has turned only a sufficient amount to move shaft 62 into an intermediate position and retract pawl 54 from its ratchet without advancing pawl 53 sufficiently far to engage ratchet 51. It will be noted that the pins 78 79 are held by collars 781 791, respectively, which are secured to the crank-shaft. Of these collars, 781 will ordinarily be fixed immovably, so that the limit of the depth feed is invariable, but the collar 791 is adjustable on the shaft, being held in position by a set-screw 792, and by varying its angular position the pin 79 may be shifted and caused to engage the weight at an early or late point in the rotation of the crank-shaft to vary the amount of the slow feed. Thus for work in which a deep cut is to be made pin 79 is adjusted for early operation of the weight, while in making a small gear where the teeth are short the pin is set to throw over the weighted lever at a later point, whereby the slow feed is not commenced until the blank has been carried up almost into position to be engaged by the cutter. By this means loss of time by bringing a blank up to the cutter at the very slow speed before the cutting begins is avoided.

The continuously-rotating casing 8 carries a gear 81, which is rigidly connected thereto, being preferably integral therewith, and this gear meshes with a gear 82, which is fast upon and causes rotation of a shaft 83. Upon its forward end this shaft carries a bevel-gear 84, meshing with a complemental bevel-gear 85, the shaft 86 of which extends outwardly and projects from the supporting-frame, from which motion is transmitted through suitable change-gears to a telescopic shaft 87, which extends toward the blank-holder and carries a worm 88, in engagement with an index-wheel 89, fast to the shaft 36. This rotation is communicated to the blank-holding spindle nearest the cutter through the pinions 37 38 previously described and provides the rotary feed of the blank. The cutter is correspondingly rotated from shaft 83 through a small spur-gear 90, fast on the shaft which meshes with a gear 91 at one side of shaft 83. This gear carries also a bevel-gear 92, meshing with a bevel-gear 93 on an inclined shaft 94, which is provided with universal joints and extends upwardly toward the cutter-rotating mechanism, being connected thereto in the same manner as is the corresponding part in the machine described in application Serial No. 182,739, above referred to.

It will be seen that the rotary feed which is operated from the casing 8 is continuous and constant in speed and is wholly independent of the crank-shaft 4, which causes the indexing of the turret and depth feed of the blank. By the appropriate change-gears the surface speed of any-sized blank may be made equal to that of the cutter, as in the prior machine referred to, and the adjustment of the apron on screw 24 provides for securing the appropriate depth of the cut.

Obviously by providing the machine with a plurality of blank-holding spindles less attention is required on the part of the operator than is the case where the machine has only a single blank-holder. Thus after all of the spindles have been supplied with blanks the machine may be left without further attention until all of the blanks have been formed into gears. Usually the machine is left until all but one of the blanks have been completed, and while the cutter is working on the last unfinished blank the completed gears on the spindles out of engagement with the cutter are removed and blanks supplied while the cutter is still operating upon the last unfinished one. Thus the machine may be caused to work continuously and the work changed without requiring the loss of time necessary with machines of the old types, which have to be stopped while the blanks are being replaced, and not only is the output of each machine increased but the number of machines that a single operator can handle is increased also, and thereby the labor item in the cost of manufacture of gears by this machine is reduced.

The turret for holding a plurality of blanks and the mechanism for indexing it and presenting the blanks to the cutter hereinbefore described is not limited in its application to use with shaping-machines which plane off the blank by means of gear-shaped cutters, since it may as well be employed with machines using milling-cutters. Therefore I desire it to be understood that my invention embraces a multiple blank-holder adapted to be employed with any kind of a gear-cutting machine and not confined to a machine of any particular construction or type.

I claim—

1. A gear-cutting machine comprising a frame, a reciprocatable and rotatable gear-cutter, a multiple blank holder or support adapted to carry at one time a plurality of similar gear-blanks to be acted on successively by one cutter, means for moving said support to present successive blanks in operative relation to the cutter, and means for rotating a blank.

2. The combination of a metal-planing cutter having a circular series of radiating or outwardly-projecting gear-shaped metal-planing teeth, a multiple blank holder or support adapted to carry a plurality of gear-blanks and movable to present them successively to the cutter, means for reciprocating one of said parts to cause the cutter to plane the blank, and means for changing the relative positions of said parts to cause the said teeth to act successively at different points on the blank and generate the curves of gear-teeth thereon.

3. The combination of a metal-planing cutter having a circular series of radiating or outwardly-projecting gear-shaped metal-planing teeth, a multiple blank holder or support for carrying a plurality of similar blanks, means for reciprocating one of said parts to cause the cutter to plane the blank, means for changing the relative positions of said parts to cause the said teeth to act successively at different points on the blank and generate the curves of gear-teeth thereon, and means for changing the relative positions of the cutter and blank-holder to present successive blanks to the action of the cutter.

4. The combination of a gear-shaped metal-planing cutter having external gear-shaped teeth arranged in a circular series, a multiple blank-holder, cutter-operating mechanism having provision for progressively rotating said cutter to make its teeth successively operative, the cutter being reciprocable to give the operative teeth their cutting and return movements, mechanism for feeding the blank rotarily, and mechanism for operating the blank-holder to present successive blanks to the action of the cutter.

5. The combination of a metal-planing cutter having a series of projecting teeth adapted to have reciprocating and lateral motions with respect to a rotating blank to cut gear-teeth on the latter, a multiple blank-holder rotatably mounted, and means for rotating the holder step by step to present successive blanks in position to be engaged by the cutter.

6. The combination of a rotatable gear-shaped planing-cutter, a multiple blank-holder comprising a rotatable turret and rotatable blank-holding means arranged with one of said blank-holding means adjacent the cutter, means for rotating the turret to bring successive blanks adjacent the cutter, and mechanism for rotating one of said blank-holding means independently of the motion of the turret at a slow speed simultaneously with the cutter.

7. The combination of a rotatable gear-shaped planing-cutter, a multiple blank-holder comprising a rotatable turret and rotatable blank-holding means arranged with one of said blank-holding means adjacent the cutter, means for rotating the turret to bring successive blanks adjacent the cutter, and mechanism arranged for detachable engagement with the blank-holding means nearest the cutter for rotating simultaneously both the cutter and said holding means.

8. The combination of a rotatable gear-shaped planing-cutter, a multiple blank-holder comprising a rotatable turret and rotatable blank-holding means arranged with one of said blank-holding means adjacent the cutter, means for rotating the turret to bring successive blanks adjacent the cutter, and mechanism comprising a rotatable shaft mounted within the periphery of the turret and between the center thereof and the cutter, means for rotating said shaft, and connections adapted to be put in detachable and rotatable engagement with the blank-holding means nearest the cutter as the turret is rotated, for rotating the blank-holding means and blank held thereby which is being acted on by the cutter.

9. The combination of a rotatable gear-shaped planing-cutter, a multiple blank-holder comprising a rotatable turret and rotatable blank-holding means arranged with one of said blank-holding means adjacent the cutter, means for rotating the turret to bring successive blanks adjacent the cutter, and mechanism for rotating the blank-holding means nearest the cutter, comprising a shaft eccentric to the turret and stationary with respect to the rotary motion thereof, the shaft being located between the cutter and the center of the turret and within the periphery of the latter, means for rotating the shaft, a clutch member carried by said shaft, and complemental clutch members carried by said blank-holding means and adapted to be brought into engagement one at a time with the shaft clutch members.

10. The combination of a rotatable gear-shaped planing-cutter, means for rotating and reciprocating the same, a multiple blank-holder movably mounted and including a rotatable turret and a plurality of blank-holding means carried thereby, mechanism for moving the multiple holder toward and away from the cutter, means operated by such motion for rotating step by step the turret to present the holding means and blanks carried thereby successively to the cutter, and mechanism for independently rotating the blank-holding means including a shaft extensible to permit movement of the holder.

11. The combination of a rotatable gear-shaped planing-cutter, a blank-holder, means for moving the same toward and from the cutter, a shaft rotatably mounted in the holder, driving mechanism connected with both the cutter and said shaft for rotating them simultaneously and including a telescopic shaft extensible to permit the said movement of the holder, a turret rotatably mounted on the holder eccentric of said shaft, a stop arranged to be engaged by the turret as the latter moves with the holder so as to turn the same, a plurality of rotatable blank-spindles carried by the turret successively up to the cutter, and complemental clutch members carried by the shaft and said spindles arranged to connect the shaft with the spindle nearest the cutter to turn the same while the cutter is being turned.

12. In a gear-cutting machine, a cutter, a multiple blank-holder including a rotatable turret and blank-holding means mounted in bearings in the turret and independently rotatable therein, mechanism for moving the same toward and away from the cutter, and a turret indexing and locking member arranged in the path of the turret to be engaged thereby and arrest the same, causing it to be turned a predetermined amount, and then preventing further turning movement thereof.

13. In a gear-cutting machine, a cutter, a multiple blank-holder comprising a reciprocable body, a turret rotatably mounted thereon, and a plurality of independently-rotatable blank-holding means mounted in bearings in the turret, movable indexing members carried by the turret, means for reciprocating said multiple holder toward and away from the cutter, and a complemental indexing member arranged to engage first one and then a second of said movable members as the holder is reciprocated to index and lock the turret.

14. In a gear-cutting machine, a cutter, a multiple blank-holder comprising a reciprocable body, a turret rotatably mounted thereon, and a plurality of independently-rotatable blank-holding means mounted in bearings in the turret, projections carried by the turret, means for reciprocating said multiple holder toward and away from the cutter, and a stationary dog arranged in the path of said projections so as to be engaged by one of them during part of the motion of the holder toward the cutter to turn the turret, and to yield and move with the holder toward the cutter during the remainder of such motion, whereby the work is enabled to be fed up to the cutter after the turret has been turned.

15. In a gear-cutting machine, a cutter, a multiple blank-holder comprising a reciprocable body, a turret rotatably mounted thereon, and a plurality of independently-rotatable blank-holding means mounted in bearings in the turret, projections mounted on the turret equal in number to the blank-holding means and correspondingly proportioned, means for moving said holder toward and away from the cutter, a carrier, a dog pivotally connected to the carrier and arranged in the path of movement of said projection in position to be engaged by one of the projections during the movement of the holder toward the cutter, the dog and carrier being adapted to offer sufficient resistance to cause rotation of the turret, and an abutment on the carrier arranged for engagement by a projection adjacent that engaging the dog to lock the turret after it has been turned.

16. In a gear-cutting machine, a cutter, a multiple blank-holder comprising a reciprocable body, a turret rotatably mounted thereon, and a plurality of independently-rotatable blank-holding means mounted in bearings in the turret, projections mounted on the turret equal in number to the blank-holding means and correspondingly proportioned, means for moving said holder toward and away from the cutter, a yieldingly-mounted carrier, a dog pivotally connected to the carrier and arranged in the path of movement of said projection in position to be engaged by one of the projections during the movement of the holder toward the cutter, the dog and carrier being adapted to offer sufficient resistance to cause rotation of the turret, and an abutment on the carrier arranged for engagement by a projection adjacent that engaging the dog to lock the turret after it has been turned, the carrier being adapted to yield after engagement of said abutment by said projection and during the remainder of the movement of the holder toward the cutter.

17. In a gear-cutter having a cutter, a turret-support, a turret, multiple blank-holding means; mechanism for moving the turret bodily at a relatively high speed to index the turret and at a reduced speed after the same has been indexed to feed the work, comprising a shaft, differential gearing for rotating the shaft, means controlled by rotation of the shaft for varying the speed thereof, and driving connections between the said shaft and the turret-support.

18. In a machine of the character described, a shaft, a gear fast to said shaft, a plurality of gears adjacent thereto and loose on the shaft, planetary gears engaging the fast gear with one of the loose gears and connecting the loose gears together independently of the fast gear, means for holding stationary either of the loose gears independently, whereby the speed of the shaft may be varied, and driving connections from the shaft to a multiple blank-support to cause reciprocation of the latter at variable speeds.

19. In a machine of the character described, a shaft, a gear fast to said shaft, a plurality of gears adjacent thereto and loose on the shaft, a pinion holder or carrier loose on the shaft, pinions journaled in said carrier and meshing with said gears in such manner as to connect the loose gears together independently of the fast gear, and to connect the fast gear with one of the loose ones, means for rotating the pinion-holder, automatic mechanism for holding first one and then another of said loose gears stationary and then releasing them, whereby the shaft is caused to travel at variable speeds and to remain stationary, and connections from said shaft adapted to reciprocate a blank-holder.

20. In a machine of the character described, a differential driving mechanism comprising a shaft, a gear fast thereto, two gears loosely mounted thereon, a loosely-rotatable carrier, a pair of planetary pinions rigidly united and carried by the carrier in mesh with the fast and one of the loose gears, a second pair of rigidly-united pinions carried by said carrier and meshing with the loose gears independently of the fast gear, means for rotating the carrier, and connections from the shaft arranged to cause reciprocation of a blank-holder.

21. In a machine of the character described, a differential driving mechanism comprising a shaft, a gear fast thereto, two gears loosely mounted thereon, a loosely-rotatable carrier, a pair of planetary pinions rigidly united and carried by the carrier in mesh with the fast and one of the loose gears, a second pair of rigidly-united pinions carried by said carrier and meshing with the loose gears independently of the fast gear, means for rotating the carrier, means for resisting motion of one of said loose gears, and connections from the shaft arranged to cause reciprocation of a blank-holder.

22. In a machine of the character described, a differential driving mechanism comprising a shaft, a gear fast thereto, two gears loosely mounted thereon, a loosely-rotatable carrier, a pair of planetary pinions rigidly united and carried by the carrier in mesh with the fast and one of the loose gears, a second pair of rigidly-united pinions carried by said carrier and meshing with the loose gears independently of the fast gear, means for rotating the carrier, automatic mechanism controlled by the shaft for resisting the motion of one of said loose gears, and connections from the shaft arranged to cause reciprocation of a blank-holder.

23. In a machine of the character described, a differential driving mechanism comprising a shaft, a gear fast thereto, two gears loosely mounted thereon, a loosely-rotatable carrier, a pair of planetary pinions rigidly united and carried by the carrier in mesh with the fast and one of the loose gears, a second pair of rigidly-united pinions carried by said carrier and meshing with the loose gears independently of the fast gear, means for rotating the carrier, members arranged to engage and arrest said loose gears, automatic operating mechanism therefor controlled by the shaft and arranged to engage one of said members with one of the loose gears and simultaneously disengage the other member and gear, whereby varying differential speeds of the shaft may be obtained, and connections from the shaft arranged to cause reciprocation of a blank-holder.

24. In a machine of the character specified, a gear-cutter, a multiple blank-holder movable bodily toward and away from the cutter, means for causing the holder to turn as it is so moved, a driving-shaft connected to the blank-holder for reciprocating the same, and driving means for the shaft adapted to rotate the shaft at different speeds, whereby the holder is moved first at a relatively high speed while it is being turned, and then more slowly to give the depth feed to the work.

25. In a machine of the character specified, a rotary and reciprocatory planing-cutter, a multiple blank-holding turret, mechanism for synchronously rotating the cutter and a blank adjacent the cutter, a normally stationary shaft connected to reciprocate said turret, and mechanism timed to operate at the conclusion of the operation on a blank to set the shaft in motion for moving the turret away from the cutter and indexing the turret to present a new blank to the cutter.

26. In a machine of the character specified, a rotary and reciprocatory planing-cutter, a multiple blank-holding turret, mechanism for synchronously rotating the cutter and a blank adjacent the cutter, a normally stationary shaft connected to reciprocate said turret, mechanism timed to operate at the conclusion of the operation on a blank to set the shaft in motion for moving the turret away from the cutter and indexing the turret to present a new blank to the cutter, and means carried by the shaft for operating said mechanism to reduce the speed of the shaft and turret during the last portion of the movement thereof toward the cutter.

In testimony whereof I have affixed my signature in presence of two witnesses.

E. R. FELLOWS.

Witnesses:
A. C. RATIGAN,
E. T. GRAHAM.